(12) United States Patent
VanHarlingen et al.

(10) Patent No.: US 7,568,029 B2
(45) Date of Patent: Jul. 28, 2009

(54) APPARATUS AND SYSTEM FOR MANAGING MULTIPLE COMPUTERS

(75) Inventors: Brian VanHarlingen, Torrance, CA (US); Michael Leibow, Rochester, NY (US); Li-ter Chen, San Gabriel, CA (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/773,381

(22) Filed: Jul. 3, 2007

(65) Prior Publication Data

US 2008/0016209 A1  Jan. 17, 2008

Related U.S. Application Data

(63) Continuation of application No. 11/105,063, filed on Apr. 12, 2005, now Pat. No. 7,240,111.

(51) Int. Cl.
*G06F 15/173* (2006.01)
(52) U.S. Cl. .................. 709/224; 709/204; 709/223; 348/14.07; 348/14.09; 348/564; 348/565
(58) Field of Classification Search .................. 709/204, 709/223, 224; 348/14.07, 14.09, 564, 565
See application file for complete search history.

(56) References Cited

U.S. PATENT DOCUMENTS

| | | | |
|---|---|---|---|
| 5,841,483 A | 11/1998 | Shafer | |
| 5,900,916 A | 5/1999 | Pauley | |
| 6,204,887 B1 | 3/2001 | Hiroi | |
| 6,233,389 B1 | 5/2001 | Barton et al. | |
| 6,237,025 B1 * | 5/2001 | Ludwig et al. | 709/204 |
| 6,373,500 B1 | 4/2002 | Daniels | |
| 6,374,296 B1 | 4/2002 | Lim et al. | |
| 6,388,658 B1 * | 5/2002 | Ahern et al. | 345/168 |
| 6,557,170 B1 * | 4/2003 | Wilder et al. | 725/130 |
| 6,671,756 B1 * | 12/2003 | Thomas et al. | 710/73 |
| 6,901,455 B2 * | 5/2005 | Gough | 710/8 |
| 7,113,978 B2 * | 9/2006 | Beasley et al. | 709/208 |
| 7,308,515 B2 * | 12/2007 | Yang | 710/72 |
| 7,415,552 B2 * | 8/2008 | Chen | 710/73 |

(Continued)

FOREIGN PATENT DOCUMENTS

EP  1164461  12/2001

(Continued)

*Primary Examiner*—Phuoc Nguyen
(74) *Attorney, Agent, or Firm*—O'Melveny & Myers LLP

(57) ABSTRACT

A switching device and system for interconnecting a single user console having user interface devices, including a console keyboard, a console video display unit, a console mouse, and speakers to a plurality of host computers each capable of using user interface devices, including a keyboard, a video display unit, and a mouse, and allowing the user to access one or more of the host computers from the single user console. The video output from each of the host computers are scaled and cropped as appropriate so that each of the host computer's video output may be simultaneously displayed as host computer "windows" on the console video display unit. The user may easily navigate between the host computers through a convenient and intuitive user interface. The audio output from each of the host computers may be mixed or switched for output to the speakers as desired.

34 Claims, 3 Drawing Sheets

U.S. PATENT DOCUMENTS

| | | |
|---|---|---|
| 2003/0112248 A1 | 6/2003 | Pronkine |
| 2003/0215218 A1 | 11/2003 | Chang |
| 2004/0015980 A1* | 1/2004 | Rowen et al. ............... 719/310 |
| 2004/0160438 A1 | 8/2004 | Shih et al. |
| 2005/0091360 A1 | 4/2005 | Chen et al. |
| 2005/0132403 A1* | 6/2005 | Lee et al. ..................... 725/38 |
| 2005/0179666 A1* | 8/2005 | Katayama et al. ........... 345/168 |

FOREIGN PATENT DOCUMENTS

| | | |
|---|---|---|
| TW | 526447 | 4/2003 |
| TW | 556089 | 10/2003 |
| TW | 220824 | 9/2004 |
| TW | 220842 | 9/2004 |
| WO | WO96/03732 | 2/1996 |

* cited by examiner

APPARATUS AND SYSTEM FOR MANAGING MULTIPLE COMPUTERS

RELATED APPLICATION DATA

This patent application is a continuation of U.S. patent application Ser. No. 11/105,063, filed Apr. 12, 2005, now issued as U.S. Pat. No. 7,240,111 on Jul. 3, 2007.

BACKGROUND OF THE INVENTION

1. Field of the Invention

The present invention relates generally to computer systems, and more particularly, to a system to enable a single user console to manage, control, and simultaneously view a plurality of host computers.

2. Description of Related Art

There exist devices for interconnecting a single computer to multiple computers. For example, a keyboard/video/mouse (KVM) switch is a device that is generally connected to multiple computers in order to enable a single keyboard, video monitor and mouse to control each of the connected computers. In this way, a user may have access to multiple computers without having to invest in corresponding keyboards, monitors, and mice for each of the computers. When the user accesses a computer connected to the KVM switch, video signals are routed from the computer, processed, and displayed on the single video monitor. Generally, the user must utilize pre-defined key sequences, such as <scroll-lock> <scroll-lock>, to release control over the first computer, return control to the KVM switch, and navigate through an on-screen menu or other display in order to access another computer connected to the KVM switch. In some cases, rather than utilizing key sequences and on-screen menus or displays in order to be able to access another computer, the user must physically actuate a button or other mechanism on the KVM switch. But requiring a user to physically access the KVM switch is adverse to the promotion of easy switching between computers, particularly if the KVM switch is placed in an inconvenient, remote, or inaccessible location, for example.

Regardless of how access to a particular computer is granted, for typical KVM switches, only the video output of the accessed computer is processed and displayed on the single video display unit. That is, a user is not able to view the video output from the other "non-accessed" computers connected to the KVM switch because video output from the "accessed" computer covers the entire video display unit. Allowing a user to view and access one computer while also allowing the user to view the other "non-accessed" computers would not only provide greater information to the user, but would also provide the foundation for enabling quick and seamless navigation between all the computers.

There are products available that allow a user to view the video output from multiple sources, such as the QuadView® XL by RGB Spectrum®, but these products do not allow the user to actually access the connected sources. The QuadView® XL, for example, is generally used for simply displaying (and manipulating) multiple images on a monitor or projector without allowing the user to control the sources themselves.

It is desirable, therefore, to provide a system that includes a management device that has an intuitive user interface to allow for easy interaction with one or more computers connected to the management device and allow for the simultaneous output of video and audio from more than one of the computers connected to the management device.

SUMMARY OF THE INVENTION

The present invention provides an apparatus and system for accessing a plurality of host computers on a single console and allowing a user to simultaneously view a "windowed" display of the video signals from each of the host computers. In one embodiment of the present invention, a management device is operatively connected to a console including a single keyboard, mouse, video display, and speakers, to control up to four host computers.

The management device of the present invention provides an advanced and intuitive user interface. The video signals from the host computers are processed for display on the video display of the console. Unlike KVM switches, which only allow a user to view the host computer the user is currently accessing, the present invention allows for the simultaneous viewing of all the host computers connected to the management device. The host computers are each displayed in a "window" or frame, which may be moved and/or re-sized on the console video display.

Furthermore, the management device of the present invention allows for the seamless access to each of the host computers and automatically generates the necessary mouse and keyboard signals to interact with the host computers. The console mouse is represented on the console video display by a console mouse pointer. In order to access a particular host computer, the user simply moves the console mouse pointer over that host computer's window. If the user wishes to access a different host computer, the user may move the console mouse pointer off of the current host computer window and onto the window of the host computer desired to be accessed. If the user does not wish to access any host computer, the user may move the console mouse pointer to the non-windowed area, for example, the desktop area of the console video display. Accordingly, the management device of the present invention will maintain the facade of a windowing interface.

In addition to the mouse pointer provided by the mouse connected to the management device, each of the host computers has its own mouse pointer. Therefore, in order to maintain a seamless windowing interface, the management device of the present invention controls the display of all of the mouse pointers on the console video display. It is preferred that only one mouse pointer, rather than five mouse pointers, be visible at any point in time. Accordingly, when none of the host computers are being accessed, the mouse pointer for the host computers may be turned off and only the console mouse pointer is shown. Similarly, when one of the host computers is being accessed, the mouse pointer for that host computer may be shown, while the console mouse pointer is turned off and the rest of the host computers' mouse pointers remain off.

When a host computer is accessed (i.e., the console mouse pointer is within the window of the host computer), the management device is able to position the mouse pointer of any accessed host computer exactly under the console mouse pointer by transmitting absolute information regarding the position of the console mouse pointer. At that point, the console mouse pointer may be turned off and the mouse pointer of the accessed host computer may be turned on. The management device can manage the display of the mouse pointers by sending control commands to the host computer. Since one of the most common protocols for controlling a mouse is the PS/2 protocol, which only uses relative information to manipulate the position of the mouse pointer, software drivers may be loaded onto the host computers in order to convert the relative positional information to absolute positional information in order to properly control of the display of the host computers' mouse pointers.

The management device of the present invention also manages the audio signals from each of the host computers. In one embodiment, the management device will mix the audio levels from the four host computers, but afford the audio of the currently accessed host computer the highest volume level. In another embodiment, the management device will only allow the audio from the accessed host computer to be sent to the speakers.

A more complete understanding of the apparatus and system for accessing and simultaneously viewing of a plurality of host computers on a single console will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides an apparatus and system that allows for the simultaneous viewing of the video output from a plurality of computers connected to a management device and provides for easy access to and intuitive access to those connected computers. In the detailed description that follows, like element numerals are used to indicate like elements appearing in one or more of the figures.

Figure 1:
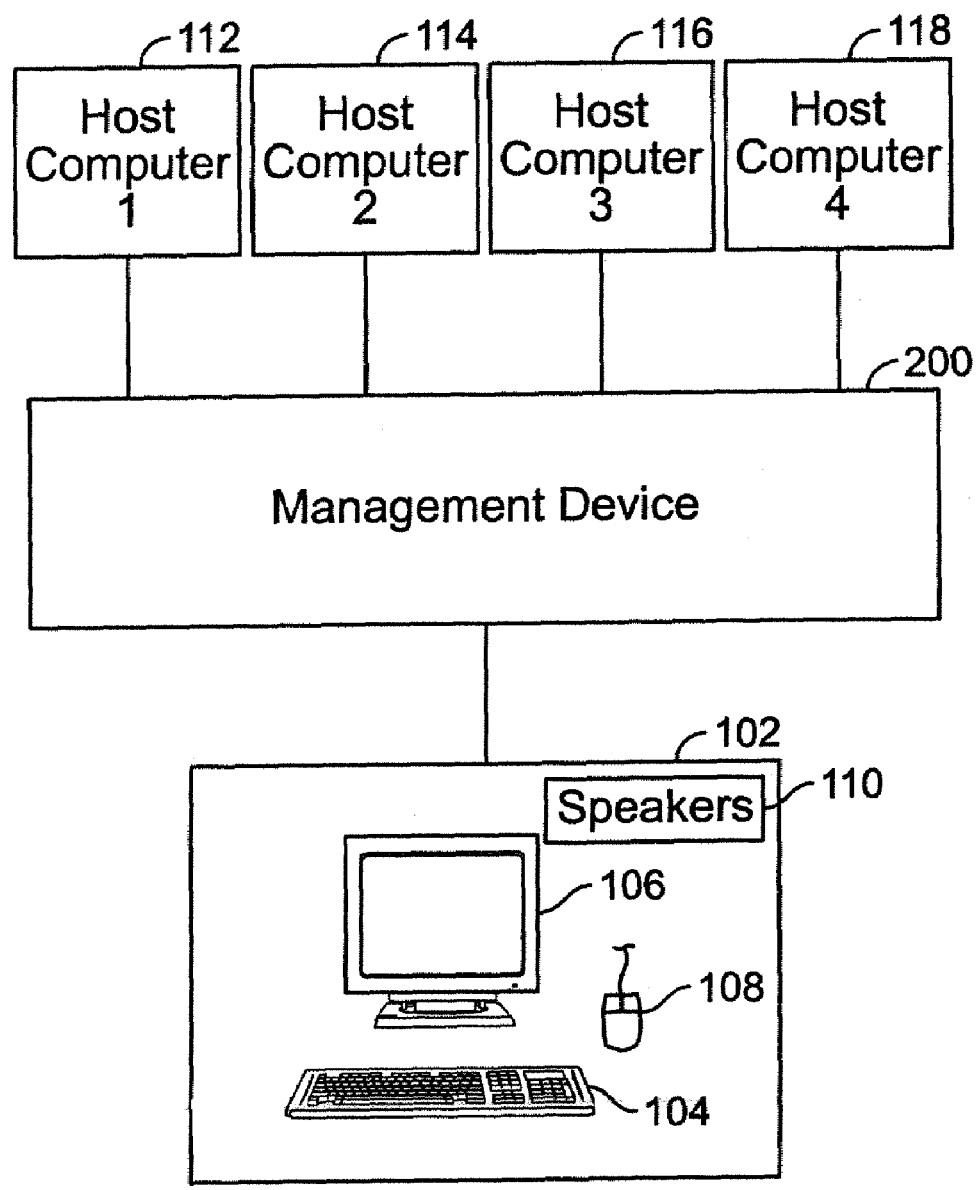
FIG. 1 is a diagram showing an exemplary system for allowing the simultaneous viewing of the video output from a plurality of computers connected to a KVM switch and for providing easy and intuitive switching between those computers.

FIG. 1 shows a system for allowing the simultaneous viewing of the video output from a plurality of computers connected to a management device and for providing easy and intuitive access to those computers. In one embodiment or the present invention, system 100 comprises a user console 102 having user interface devices, including a console keyboard 104, a console video display unit 106, a console mouse 108 and console speakers 110, a management device 200, and four host computers 112, 114, 116, and 118. The management device 200 is disposed between the user console 102 and the four host computers 112, 114, 116, and 118. The management device 200 processes signals from the console keyboard 104 and the console mouse 108 for use by the appropriate host computer, e.g., host computer 112. In addition, the management device 200 processes the video signals from the host computers 112, 114, 116, and 118 such that video signals from each of the host computers may be displayed on the console video display unit 106 simultaneously. Video signals are transmitted through the system 100 primarily in one direction, i.e., from the host computers 112, 114, 116, and 118 to the console 102. Generally, video monitors such as the console video display unit 106 can receive analog video signals (such as those transmitted under the video graphics array (VGA) standard), digital video signals, or both (such as those transmitted under the digital video interface-integrated (DVI-I) standard). Such video monitors may also include a display data channel to communicate monitor information, such as that required under the Video Electronics Standards Association (VESA) DDC2B standard.

As with the video signals, audio signals are also transmitted through the system 100 primarily from the host computers 112, 114, 116, and 118 to the console 102. In one embodiment, the audio signals from each of the host computers 112, 114, 116, and 118 are sent through respective outputs, e.g., audio input/output 140, to an audio controller 184 located in the management device 200. The audio controller 184 controls an audio mixer 186 that is connected to console speakers 110. Each of the audio signals are mixed such that the audio from each of the host computers can be heard, but the audio from the currently accessed host computer, e.g., host computer 112, will have a higher volume then the other host computers, e.g., host computers 114, 116, and 118. In another embodiment, the audio controller 184 may mute or otherwise prevent the audio signals from all the host computers except for the currently accessed host computer from reaching the console speakers 110.

Figure 2:
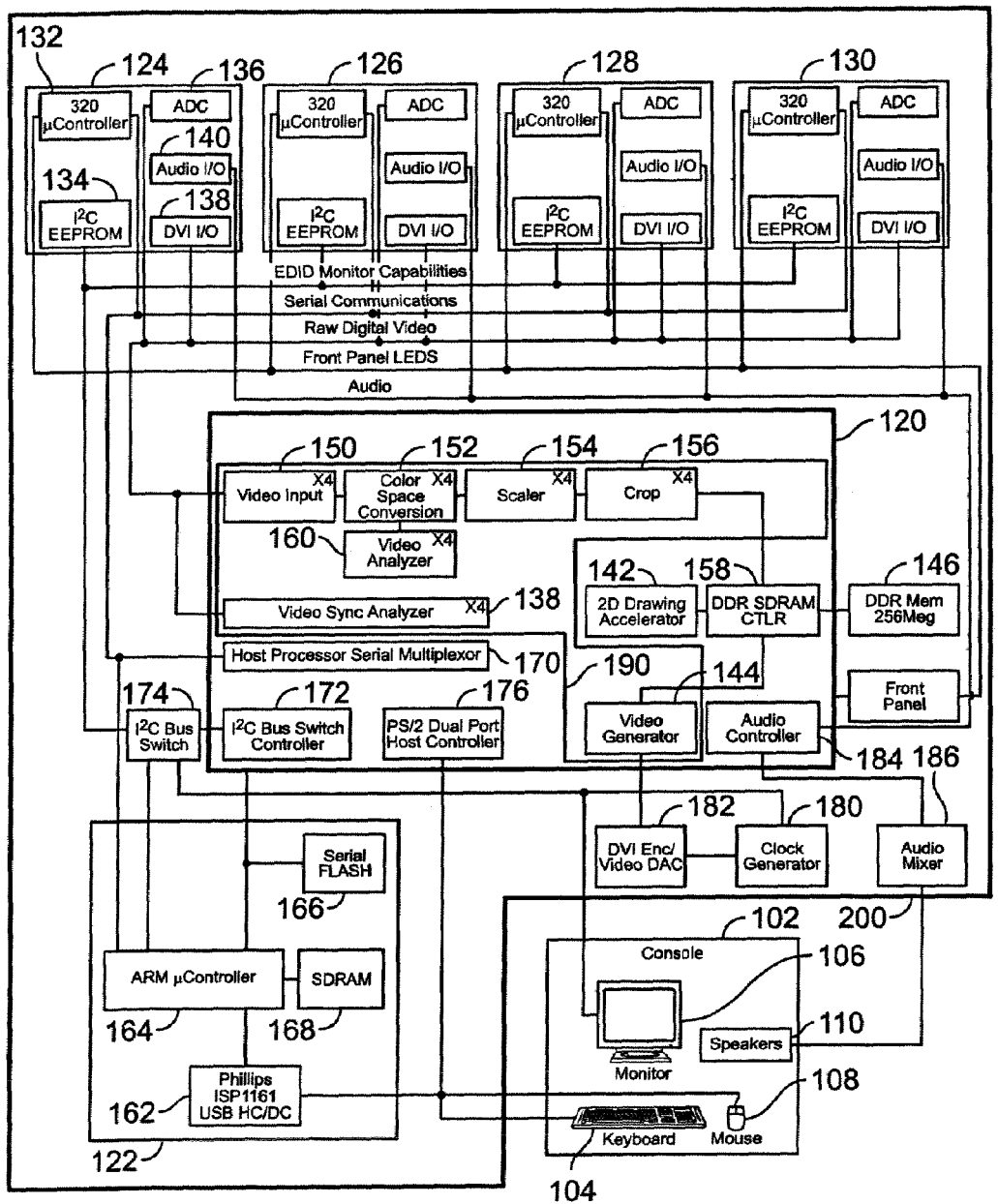
FIG. 2 is a diagram showing an exemplary KVM switch according to the invention.

FIG. 2 is a diagram showing an exemplary management device 200 according to an embodiment of the invention. Management device 200 comprises an integrated circuit 120, a console processing unit 122, and host processing modules 124, 126, 128, and 130. The host processing modules 124, 126, 128, and 130 provide the interface between the host computers 112, 114, 116, and 118, respectively and the management device 200. The number of host processing modules may vary depending on the number of host computers that can be allowed to connect to a particular management device. For example, there may be a one-to-one correspondence between host processing modules and host computers. On the other hand, it may be possible for a host processing module to be multiplexed to multiple host computers. Furthermore, a KVM switch may be disposed between a plurality of host computers and at least one host processing module to thereby increase the total number of host computers that may be managed.

In one embodiment of the present invention, the host processing modules, e.g. 124, each comprise a host microcontroller 132 and an erasable programmable read-only memory (EEPROM) 134 (e.g., the Philips Semiconductor Inter-IC ($I^2C$) EEPROM). It is generally desirable for the host processing module to be able to handle both analog and digital video signals. Therefore, in an embodiment of the present invention, the host processing modules, e.g. 124, may further include an analog-to-digital converter (ADC) 136 (such as the Xicor X98017 ADC), as well as a digital video input/output 138. When only analog video signals or only digital video signals are generated by the host computers, e.g. 102, the host processing modules, e.g. 124, will automatically process whichever video signal is present. If both analog and digital video signals are present, the host processing module may be programmably set to choose one signal over the other, or may simply select by default either the analog or digital video signals.

The integrated circuit (such as a field programmable gate array (FPGA) or other programmable logic device) 120 is responsible for analyzing and processing the video signals from each of the host computers, e.g., host computer 112. It is conceivable that an application-specific integrated circuit (ASIC) may be utilized, but ASICs generally require a large up-front cost that could outweigh the benefit of a reduced bill-of-material cost. The integrated circuit 120 comprises a two-dimensional drawing accelerator 142, an intermediate frame buffer controller 158, a host processor serial multiplexer 170, a PS/2 dual port host controller 176, a video processing unit 190, and an audio controller 184.

The integrated circuit 120 is also utilized to control the flow of data between the host computers and the user console 102. A $I^2C$ bus switch 174 is connected between the host computers' $I^2C$ EEPROM (e.g. 134), and a microcontroller 164 (such as those designed by ARM Limited) within the console processing unit 122, in order to initiate and terminate data transfers from the host computer to the console 102. The integrated circuit 120 further comprises a $I^2C$ bus switch controller 172 (such as those designed by Philips Semiconductor), which controls the $I^2C$ bus switch 174 or other high-speed connection to allow the microcontroller 164 to communicate with $I^2C$ devices in the host computers.

The video processing unit 190 comprises a video input 150, a color-space conversion module 152, a scaling module 154, a cropping module 156, a video analyzer 160, a video sync analyzer 138, and a video generator 144. The video analyzer 160 analyzes the video stream in order to determine the boundary of the active video region of the digital video signals. Furthermore, the video analyzer 160 may attempt to improve the images captured by adjusting the parameters of the ADCs, e.g. 136, in the host processing modules. In addition to digital video signals, the host computers also transmit video synchronization signals to the video synchronization analyzer 138. The video synchronization analyzer 138 analyzes the video synchronization signals to determine the resolution and location of the active video region of the digital video signal.

Once the active video region of the digitized video signal is determined, the digital video signal is scaled and cropped as appropriate by the scaling module 154 and the cropping module 156, respectively, the intermediate frame buffer controller 158 stores it in a frame buffer (such as a double data rate-synchronous dynamic random access memory (DDR-SDRAM)) 146. In the case of four host computers, there is a video input 150, color-space conversion module 152, scaling module 154, cropping module 156, video analyzer 160, and video sync analyzer 138 corresponding to each of the host computers.

The frame buffer 146 or some other intermediate storage is required because the host computers are asynchronously providing video signals to the integrated circuit 120 at different frequencies and phases. The video card of each host computer is completely separate and isolated from the video cards of other host computers. Therefore, although each host computer may be outputting the same video resolution, the time domain of each output will be different from each other. Similarly, the video output clock rate of the management device 200 may also be running at a different time domain from the host computers as a result of its own internal clock generator 180. But this is not necessarily the case, for example, where the management device video output utilizes signals from one of the inputted host computers in order to match time domains. Nevertheless, because at least three of the video signals from the host computers will be out of synchronicity from the management device video output, a video frame may need to be skipped or added for each host computer at a recurring point in time. That is, if a host computer video signal input is slower than the management device video output, a frame may need to be added since the data will not otherwise be available. Conversely, if a host computer video signal input is faster than the management device video output, a frame may need to be skipped.

After the active region frame portions are recorded, they are stored in the frame buffer 146 along with a screen representation drawn by the two-dimensional drawing accelerator 142. A composite image is digitally formed by a video generator 144 and optionally converted to analog via a digital-to-analog converter 182 before being transmitted to the console video display unit 106 and displayed as a "host computer window."

Figure 3:
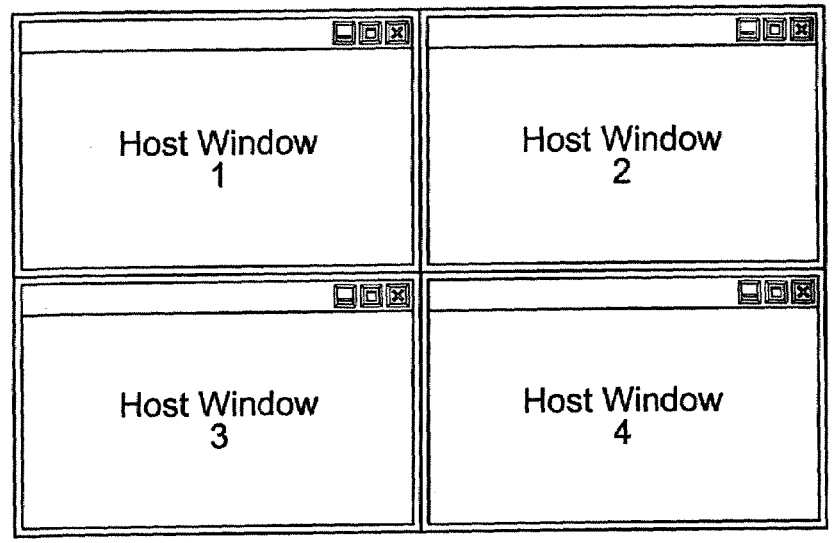
FIG. 3 is a diagram showing an exemplary layout of host windows on the console display unit.

FIG. 3 shows an exemplary arrangement whereby each of the host computer windows are displayed on the console video display unit 106. The size and position of each of the host computer windows displayed within the console video display unit 106 may be manipulated by the user.

The digital video signals transmitted from the host processing units to the integrated circuit 120 consume a large amount of bandwidth. For example, if each host processing unit transmits a video signal with a screen resolution of 1600×1200 with a refresh rate of 60 Hz and in 24-bit color, the frame buffer 146 would be required to handle nearly 2 GB of data per second. In order to reduce cost, however, it is preferable to reduce the amount of total video bandwidth. This may be achieved by utilizing the color-space conversion module 152, the scaling module 154, and the cropping module 156.

Generally, a digital video signal is formed using red-green-blue (RGB) colors in an orthogonal color space. This color space has an axis representing luminance (light intensity), while the two other axes represent chrominance (difference between one color and a reference color of the same brightness and quality of a color). It is well known that the human eye can perceive the luminance of an image much better than chrominance. Therefore, the chrominance may be bandwidth-reduced in an image without significant degradation to the perceived image quality. Accordingly, the color-space conversion module 152, in conjunction with the video analyzer 160, can reduce the video data from 24-bit color to 16-bit color, for example. For the video signal with a pixel resolution of 1600×1200 and refresh rate of 60 Hz, this reduction alone would decrease the bandwidth that the frame buffer 146 would be required to handle to about 1.3 GB/s.

Figure 4:
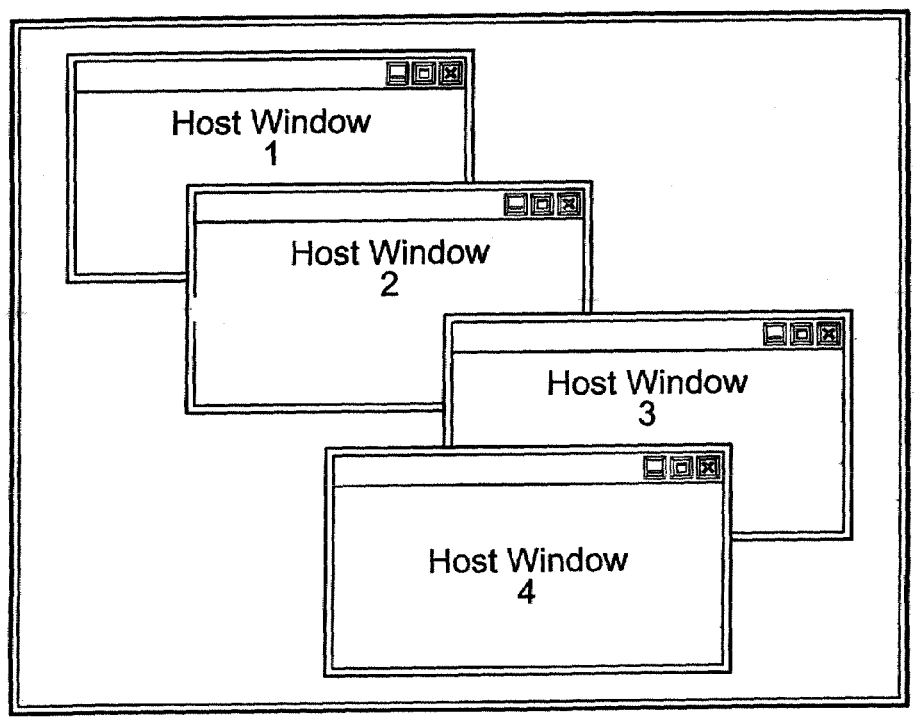
FIG. 4 is a diagram showing an exemplary layout of host windows on the console display unit.

The amount of required bandwidth handled by the frame buffer 146 is further reduced via the scaling module 154 and the cropping module 156. The scaling module 154 proportionally reduces the size of the host computer windows so that more than one host computer window may be visible at a given time. These scaled windows may be -,made larger or smaller according to the preference of the user. Then cropping module 156 removes portions of the host computer windows that cannot be seen due to any overlapping between windows. In FIG. 4, for example, host computer window 4 is fully visible while the host computer windows 1 through 3 are each at least partially covered. The cropping module 156 removes the data corresponding to the sections that cannot be seen. In this way, the bandwidth required to be handled by the frame buffer 146 is reduced by three-fourths; thus, for the video signal with a pixel resolution of 1600×1200 and frequency of 60 Hz, for example, the bandwidth could be reduced to approximately 325 MB/s. This is because the total amount of visible space on the console video display unit 106 will never exceed one screen worth of data. In other words, if the entire visible space of the console video display unit 106 was covered, for example, by a single host window, all the data from the other three host windows would be removed because those windows cannot be seen. Accordingly, the bandwidth required would be one-fourth of the total bandwidth.

It should be noted that rather than having the color-space conversion module 152 in the integrated circuit 120, a similar function could be performed within the ADC 136 in the host processing module. For example, an ADC such as the Analog Devices AD9880 is capable of performing this function.

In addition to reducing the bandwidth as described above, the total incoming video bandwidth may be reduced by removing one or more frames from the video stream. That is, the color-space conversion module 152, video analyzer 160, scaling module 154, and cropping module 156, may all be temporarily or periodically disabled under software control in order to skip incoming frames. This may be necessary in situations such as if the available video bandwidth is temporarily exceeded when the frame buffer is used for another purpose in addition to storing the four input video frames and producing one video output frame. For example, additional bandwidth may be required if the user has moved a host window and the two-dimensional drawing accelerator 142 is required redraw a frame stored in the frame buffer 146 in order to flood-fill a space in the frame. The periodic skipping incoming frames is done in such a way that the user is minimally (if at all) visually aware that any frames have been skipped.

Data from the console keyboard 104 and console mouse 108 is transmitted through the system 100 primarily in the opposite direction from the video signals, i.e., from the console 102 to the host computers 112, 114, 116, and 118. Data from the console keyboard and console mouse can be either in Universal Serial Bus (USB) or PS/2 format.

The user console 102 is operatively connected to the console processing unit 122, which comprises a USB Host Controller and Device Controller (USB HC/DC) 162 (such as the Philips ISP1161), the microcontroller 164, a serial FLASH memory 166, and a SDRAM 168. If the data from the user console 102 is in PS/2 format, the data is transmitted as a serial bitstream to a PS/2 dual port host controller 176 in the integrated circuit 120. The PS/2 dual port host controller 176 prepares the data, for example, by removing the handshaking information and parity from the bitstream, prior to processing by the microcontroller 164. The microcontroller 164 then converts the data from the PS/2 dual port host controller 176 into data packets (internal serial format), which are transmitted through a host processor serial multiplexer 170 in the integrated circuit 120 to the host microcontrollers, e.g. 132. The host microcontroller, e.g. 132, may then convert the mouse and keyboard information (such as "key up" or "key down" commands) from the internal serial format back into the PS/2 format.

The handling of data is similar when the data from the user console 102 is in USB format, with the primary exception that the data is first handled by the USB HC/DC 162 in the console processing unit 122 (rather than the PS/2 dual port host controller 176) before being processing by the microcontroller 164. It is desirable, but not always necessary, for the data-type to be kept the same from the user console 102 to the host computer. For example, if a PS/2 mouse is used at the user console 102, and both a PS/2 and USB cable are connected to the host computer, the PS/2 connection will be preferred. Similarly, if a USB mouse were used, then the USB connection would be preferred. Accordingly, it is preferable that the internal serial format include an identification of the original format of the data.

By converting the format of the data sent from the console 102 into internal serial format (rather than sending the original PS/2 or USB data), greater efficiencies in speed, cost, and compatibility are achieved. For example, the present invention takes advantage of the fact that almost all microcontrollers have a universal asynchronous receiver/transmitter (UART) to handle serial data, while microcontrollers rarely have PS/2 hardware. In addition, UARTs handle the serial data very quickly, and require fewer input/output ports and less resources than PS/2 hardware.

The host microcontrollers may simulate input/output devices to facilitate system software when actual devices are not attached to the management device 200. For example, the host microcontroller e.g. 132 may simulate a keyboard and a mouse when no actual keyboard or mouse is attached to the management device 200. This is particularly useful because the host computers may not boot properly unless a keyboard and/or mouse is connected to the management device 200 and may avoid errors if the keyboard and/or mouse is removed from the management device 200 during normal operation. In addition, there are dozens of signal groups, device drivers, systems states, and real-time events that are handled by the host microcontroller 132. For example, as explained below, the host microcontroller 132 may require a software driver to handle the special display considerations when there is a console mouse pointer and up to 4 additional host computer mouse pointers.

The position of the console mouse 108 is represented on the console video display unit 106 by a console mouse pointer. In addition, each of the host computers will also have a corresponding host mouse pointer. When all four of the host computers are connected to the management device 200, it is preferred that only one mouse pointer, rather than five mouse pointers, be visible at any given time. Therefore, in a preferred embodiment of the present invention, the four host mouse pointers and the KVM mouse pointer will appear as one mouse pointer on the console video display unit 106.

A standard PS/2 or USB mouse transmits information causing the mouse pointer to move a certain number of counts up, down, left, or right from the mouse pointer's current position. Once a host computers active region is displayed as a window on the console video display unit 106, it is preferable that the host mouse pointer track the console mouse pointer when the console mouse pointer is within the host computer's active region. Therefore, the management device 200 needs to know the position of the console mouse pointer with respect to the host computer window. Since a standard mouse typically transmits only relative positional information, the management device 200 positions the host mouse pointer exactly under the console mouse pointer by converting the relative positional information of the console mouse pointer into absolute positional information using driver software loaded on the host computer. The procedure for converting a mouse's relative positional information into absolute positional information is well known to a person skilled in the art of windowing systems.

Alternatively, it would be possible to find the location of the console mouse pointer with respect to the host computer window by analyzing the video stream, but this would require the management device 200 to perform image recognition. Among the many difficulties, including the need for substantial processing power, it would also require that the management device 200 maintain software compatibility regardless of the operating system and program running on the host computers. Accordingly, this option is less desirable.

When the console mouse pointer is within the boundary of a host window, the management device 200 may remove, or turn off, the console mouse pointer and the host mouse pointer may be turned on. Conversely, when the console mouse pointer is moved outside the boundary of a host window, the host mouse pointer may be turned off and the console mouse pointer turned on. This may be accomplished by sending control data or commands, in addition to the normal keyboard and mouse data, to the microcontroller of the host computer being accessed. For example, the console may send additional data to the host microcontroller, e.g., microcontroller 132, such as commands to "switch to relative mouse addressing" (when moving the console mouse pointer within a host window); "switch to absolute addressing" (when moving the console mouse pointer outside of the host windows); "hide host mouse pointer" (when the console mouse pointer is outside of the host windows); and "show host mouse pointer" (when the console mouse pointer is within a host window). Accordingly, an appearance of seamless mouse operation between the host window and the console desktop may be achieved.

The above-described mouse pointer operation occurs in the embodiment of the present invention, where as soon as the console mouse pointer enters the host window of a given host computer, access to that host computer is allowed. In another embodiment of the present invention, in order for access to a given host computer to be allowed, the user must first move the console mouse pointer over the respective host window and "double-click" on the host window. When access to the host computer has been allowed, the console mouse pointer will disappear (i.e., be turned off) and the user effectively gains control over the host computer mouse whose pointer has been turned on.

If it should become necessary to return control from a host computer to the management device 200, a key sequence, such as <control> <control> can be used to remove "focus," or control, from the host computer and return control to the management device 200. The key sequence to accomplish this is entirely arbitrary, and may be programmable. Generally, the key sequence should be one that is rarely, if ever, used during normal computer operation. Notably, however, such a key sequence is normally not necessary when switching between two host computers.

Having thus described a preferred embodiment of an apparatus and system that allows for the simultaneous viewing of the video output from a plurality of computers connected to a console device and provides for easy access to and intuitive switching between those connected computers, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A computer management system comprising:
 a plurality of host computers;
 a user console having associated user interface devices including a keyboard, a cursor control device, and a video display unit; and
 a management device operatively connecting the user console to the plurality of host computers, wherein the management device manages keyboard control signals and cursor control signals transmitted from the user console to the plurality of host computers, buffers incoming video frames received from the plurality of host computers, and permits selective user manipulation of the incoming video frames;
 wherein, the management device enables simultaneous display of selectively manipulated incoming video frames of plural ones of the plurality of host computers on the user console video display unit, enables simultaneous communication of cursor control signals to plural ones of the plurality of host computers, and enables communication of keyboard control signals to a selected one of the plurality of host computers.

2. The computer management system of claim 1, wherein the management device further comprises at least one frame buffer corresponding to each of the plurality of host computers for buffering the incoming video frames transmitted from each of the plurality of host computers.

3. The computer management system of claim 1, wherein the management device enables simultaneous display of the selectively manipulated video frames of plural ones of the plurality of host computers on the user console video display unit in an at least partially overlapping manner.

4. The computer management system of claim 1, wherein the management device enables simultaneous display of the selectively manipulated video frames of plural ones of the plurality of host computers on the user console video display unit in a split screen manner.

5. The computer management system of claim 4, wherein the management device further enables selective alteration of a center point for orientation of the selectively manipulated video frames in the split screen manner.

6. The computer management system of claim 1, wherein the management device enables display of the selectively manipulated video frames of at least one of the plurality of host computers on at least a portion of the user console video display unit.

7. The computer management system of claim 1, wherein the management device enables simultaneous display of the selectively manipulated video frames on the user console video display unit in an at least partially cascading manner.

8. The computer management system of claim 1, wherein the management device further comprises at least one scaling module adapted to selectively alter scale of the video frames.

9. The computer management system of claim 1, wherein the management device further comprises at least one cropping module adapted to selectively crop the video frames.

10. The computer management system of claim 1, wherein the user console further comprises speakers operatively connected to the plurality of host computers via the management device, wherein the management device enables selective mixing of audio signals from the plurality of host computers prior to being sent to the speakers.

11. The computer management system of claim 10, wherein level of the audio signals from the selected one of the plurality of host computers is higher than the corresponding level of audio signals from other ones of the plurality of host computers.

12. The computer management system of claim 1, wherein the selectively manipulated video frames include a corresponding boundary represented on the user console video display unit.

13. The computer management system of claim 1, wherein the management device provides absolute positional information of a user console cursor that is visually represented on the user console video display unit.

14. The computer management system of claim 1, wherein the management device enables selection of one of the plurality of host computers for communication of keyboard control signals thereto upon movement of a user console cursor outside of a displayed portion of the selectively manipulated video frames from the selected host computer and upon receipt of a predetermined user activation command.

15. The computer management system of claim 14, wherein the management device terminates selection of the selected host computer upon movement of the user console cursor outside of a displayed portion of the selectively manipulated video frames from the selected host computer and upon receipt of a predetermined user termination command.

16. The computer management system of claim 1, wherein the plurality of host computers have respective host computer cursors, the host computer cursor of any one of the plurality of host computers being visually displayed upon movement of the user console cursor within a displayed portion of the corresponding selectively manipulated video frames.

17. The computer management system of claim 1, wherein the plurality of host computers have respective host computer cursors, the host computer cursor of any one of the plurality of host computers being visually hidden upon movement of the user console cursor out of a displayed portion of the corresponding selectively manipulated video frames.

18. In a computer management system comprising a plurality of host computers and a user console having user interface devices including a keyboard, a cursor control device, and a video display unit, a management device operatively connects the user console to the plurality of host computers, wherein the management device manages keyboard control signals and cursor control signals transmitted from the user console to the plurality of host computers, buffers incoming video frames received from the plurality of host computers, and permits selective user manipulation of the video frames;
wherein, the management device enables simultaneous display of selectively manipulated video frames of plural ones of the plurality of host computers on the user console video display unit, enables simultaneous communication of cursor control signals to plural ones of the plurality of host computers, and enables communication of keyboard control signals to a selected one of the plurality of host computers.

19. The management device of claim 18, further comprising at least one frame buffer corresponding to each of the plurality of host computers for buffering the incoming video frames transmitted from each of the plurality of host computers.

20. The management device of claim 18, further enabling simultaneous display of the selectively manipulated video frames of plural ones of the plurality of host computers on the user console video display unit in an at least partially overlapping manner.

21. The management device of claim 18, further enabling simultaneous display of the selectively manipulated video frames of plural ones of the plurality of host computers on the user console video display unit in a split screen manner.

22. The management device of claim 21, further enabling selective alteration of a center point for orientation of the selectively manipulated video frames in the split screen manner.

23. The management device of claim 18, further enabling display of the selectively manipulated video frames of at least one of the plurality of host computers on at least a portion of the user console video display unit.

24. The management device of claim 18, further enabling simultaneous display of the selectively manipulated video frames on the user console video display unit in an at least partially cascading manner.

25. The management device of claim 18, further comprising at least one scaling module adapted to selectively alter scale of the video frames.

26. The management device of claim 18, further comprising at least one cropping module adapted to selectively crop the video frames.

27. The management device of claim 18, wherein the user console further comprises speakers operatively connected to the plurality of host computers via the management device, further enabling selective mixing of audio signals from the plurality of host computers prior to being sent to the speakers.

28. The management device of claim 27, wherein level of the audio signals from the selected one of the plurality of host computers is higher than the corresponding level of audio signals from other ones of the plurality of host computers.

29. The management device of claim 18, wherein the selectively manipulated video frames include a corresponding boundary represented on the user console video display unit.

30. The management device of claim 18, further providing absolute positional information of a user console cursor that is visually represented on the user console video display unit.

31. The management device of claim 18, further enabling selection of one of the plurality of host computers for communication of keyboard control signals thereto upon movement of the user console cursor outside of a displayed portion of the selectively manipulated video frames from the selected host computer and upon receipt of a predetermined user activation command.

32. The management device of claim 31, further enabling termination of selection of the selected host computer upon movement of the user console cursor outside of a displayed portion of the selectively manipulated video frames from the selected host computer and upon receipt of a predetermined user termination command.

33. The management device of claim 18, wherein the plurality of host computers have respective host computer cursors, the host computer cursor of any one of the plurality of host computers being visually displayed upon movement of the user console cursor within a displayed portion of the corresponding selectively manipulated video frames.

34. The management device of claim 18, wherein the plurality of host computers have respective host computer cursors, the host computer cursor of any one of the plurality of host computers being visually hidden upon movement of the user console cursor out of a displayed portion of the corresponding selectively manipulated video frames.

* * * * *